United States Patent [19]

Epstein et al.

[11] 3,993,729

[45] Nov. 23, 1976

[54] PROCESS FOR THE MANUFACTURE OF POTASSIUM PHOSPHATES

[75] Inventors: Joseph Epstein; Eli Mosche Feist; Daniel Altaras, all of Beer-Sheva, Israel

[73] Assignee: Dead Sea Works Ltd., Beer Sheva, Israel

[22] Filed: Jan. 16, 1974

[21] Appl. No.: 433,977

[30] Foreign Application Priority Data

Jan. 22, 1973 Israel.................................... 41356

[52] U.S. Cl. ............................. 423/184; 423/312; 423/309
[51] Int. Cl.² .................... C01D 0/00; C01B 15/16; C01B 25/26
[58] Field of Search ........... 423/184, 311, 308, 312, 423/309

[56] References Cited
UNITED STATES PATENTS

| | | | |
|---|---|---|---|
| 3,328,118 | 6/1967 | Saskura | 423/311 |
| 3,661,513 | 5/1972 | Barker | 423/311 |

*Primary Examiner*—Oscar R. Vertiz
*Assistant Examiner*—Gregory A. Heller
*Attorney, Agent, or Firm*—Lawrence Rosen; E. Janet Berry

[57] ABSTRACT

The present invention relates to an improved method for the manufacture of potassium phosphates. More specifically the present invention provides a process for the manufacture of monopotassium phosphate, $KH_2PO_4$, from potassium bearing brines.

21 Claims, No Drawings

PROCESS FOR THE MANUFACTURE OF POTASSIUM PHOSPHATES

A number of methods have been proposed for the direct recovery of potassium values from potassium-bearing brines by precipitation as an insoluble compound. In one such proposal, by George D. R. et al., Chem. Eng. Progress 64 (5), 1968, pp. 96–99, an aqueous solution of sodium perchlorate is added at a low temperature to a potassium-bearing brine so as to precipitate potassium perchlorate. The precipitate is dissolved in hot water, and converted to potassium chloride, sulphate or carbonate by being treated with the corresponding sodium salt in a cation exchange system, using a resin cation exchanger. Such a system could evidently also be used to prepare potassium phosphate salts, but is unlikely to be economic due to the need for the prior preparation of the corresponding sodium salts. Further, the use of resin ion exchangers in continuous processing, while undoubtedly feasible, is cumbersome.

Monopotassium phosphate is of growing interest as a fertiliser having a high nutrient value, in addition to being a starting material for the preparation of potassium polyphosphates, and accordingly many processes have been proposed for its manufacture. The direct neutralisation of phosphoric acid by potassium hydroxide or carbonate is readily seen to be uneconomic, if the product is to be used as a fertiliser, so the proposed methods hitherto have been based on potassium chloride as starting material. Thermal processes have been proposed, in which the following reaction occurs:

$$KCl + H_3PO_4 \rightarrow KH_2PO_4 + HCl$$

the hydrogen chloride leaving in gaseous form. However, the yield of the said reaction is poor unless a large excess of phosphoric acid is used, in which case the solid product obtained is not the desired salt $KH_2PO_4$ but the double compound (acid salt) $KH_2PO_4 \cdot H_3PO_4$, which requires a further step for its decomposition. A further drawback in the thermal processes is the need for pure starting materials, as all impurities present in the feed potassium chloride and phosphoric acid are carried through to the solid product. In addition, the phosphoric acid used must be concentrated otherwise the heat requirement in the thermal process, in which all water fed to the reaction system is evaporated and expelled together with the hydrogen chloride gas, would be excessive, and render the process uneconomical for fertiliser production. Lastly, the high temperatures required for the said thermal process cause problems of corrosion, and could lead to the formation of insoluble potassium metaphosphate, unless special precautions are taken, such as that proposed by R. Blumberg et al. in Israel Pat. No. 21072, i.e., the addition of an organic substance to the reaction mixture so as to expel the hydrogen chloride at a lower temperature; however even with that improvement, the reaction temperature remains in the range of 120° to 160° C, so the corrosion problems remain.

It is known that the cost of concentration and purification is a very significant part of the cost of production of high-grade phosphoric acid. It is likewise known that the cost of separating potassium chloride from sodium and magnesium chlorides, with which the naturally occurring forms of potassium chloride such as carnalite, sylvinite, or saline waters are usually associated, is a major part of the cost of production of potassium chloride pure enough for use in the said thermal process for production of mono-potassium phosphate. It is thus readily apparent that a process for preparing mono-potassium phosphate which can employ dilute and unpurified forms of both potassium chloride and phosphoric acid, and which can be carried out at ambient temperature, would be a highly desirable and economically attractive process.

One process which has been previously described by Thompson W. H., Chemical Engineering, April 5, 1971 by-passes the production of phosphoric acid altogether. Potash is treated with excess sulphuric acid at about 200° C so as to produce a slurry of potassium bisulphate in sulphuric acid. Reaction of this slurry with phosphate rock at about 70° C gives a precipitate of calcium sulphate which is removed by filtration, and a mother liquor containing mono-potassium phosphate and phosphoric acid. Direct concentration of this mother liquor would precipitate not the desired mono-potassium phosphate, but the acid salt $KH_2PO_4 \cdot H_3PO_4$, as in the previously described thermal process, so instead methanol is added to the said mother liquor to precipitate the desired salt $KH_2PO_4$. The methanol is subsequently recovered.

The above process is preferable to the previously described thermal process in that the normally required step of production and concentration of phosphoric acid is obviated, and in that the reaction producing the desired mono-potassium phosphate occurs at a relatively low temperature, at which the corrosion problems are reduced and at which there is no risk of production of insoluble potassium metaphosphate. However, in spite of the said advantages, the above process nevertheless requires solid potassium chloride as the source of potassium ion, which is a disadvantage in those regions where potassium chloride is naturally available only in the form of a dilute aqueous solution containing also the chlorides of other cations. The principal object of this invention is therefore to devise a means of production of mono-potassium phosphate from dilute and impure sources of potassium ion.

It is a further object of this invention to produce directly a potassium phosphate salt or mixture of salts having a $K_2O : P_2O_5$ ratio of 1 : 1, which is a very desirable formulation for high-nutrient fertilizer. The prior art based on the previously mentioned processes required the mono-potassium phosphate resulting from said processes to be further treated with potassium-bearing materials such as potassium carbonate, hydroxide, or chloride, if a higher $K_2O : P_2O_5$ ratio were desired; such a step involved significant expenditure if potassium hydroxide or carbonate was used, or a reduction in total plant nutrient value of the final product if potassium chloride was used.

An ambient temperature process for production of mono-potassium phosphate, or a mixture having an average composition $K_{1.5}H_{1.5}PO_4$, from potassium chloride and phosphoric acid of any concentration, has been previously proposed by Kunin, Ind. Eng. Chem. 56 (1), 1964 pp. 35–39, and incorporated into U.S. Pat. No. 3,661,513 (1972). The said process is based on liquid anion exchange. An amine extractant, dissolved in an inert solvent, is used to shift the reactions.

$$KCl + H_3PO_4 \rightleftharpoons KH_2PO_4 + HCl \qquad \text{or}$$

$$3KCl + 2H_3PO_4 \rightleftharpoons KH_2PO_4 + K_2HPO_4 + 3HCl$$

to the right by removing HCl as soon as it is formed, the resulting chloride salt of the amine being treated with any suitable base so as to regenerate the free amine for reuse. The theoretical basis for the said process is the higher affinity of liquid anion exchangers for the chloride ion than for the phosphate ions $H_2PO_4^-$ or $HPO_4^{--}$. The said process overcomes many of the drawbacks of the previously mentioned thermal process of manufacture of mono-potassium phosphate, but nevertheless requires the use of potassium chloride of at least fertiliser-grade quality. As previously stated, the cost of separation of potassium chloride from the other metallic chlorides normally present in potassium-bearing brines is considerable, so it would be desirable to devise means of by-passing the said separation completely.

Thus according to the present invention it has now been discovered that a number of the anions which form insoluble salts with potassium possess a considerable affinity for anion exchangers, both solid and liquid, the affinities being higher than for chloride ion and considerably higher than for the mono- or dihydrogen phophate ions. Such anions include permanganate, perrhenate, perchlorate, chlorate, chloro platinate, fluoborate and tetraphenyl borate and combinations thereof can also be used.

The present invention accordingly embodies a process for the preparation of potassium phosphates from potassium-bearing brines by precipitation as an insoluble potassium salt, with subsequent conversion of the said precipitate to a potassium phosphate salt, or mixture of salts, by liquid anion exchange, using an amine extractant. The said conversion is similar to that proposed in U.S. Pat. No. 3,661,513, but will take place at a much higher efficiency of conversion per stage, due to the very high selectivity of the anions forming insoluble potassium salts as compared to phosphate ions. The only chemicals required for the process according to the present invention are phosphoric acid of any concentration and purity, a base for regeneration of amine extractant, and make-up of reagents.

A more complete description of the process according to the present invention will now be given.

A potassium bearing brine is mixed in any suitable contacting device with an aqueous solution of the calcium and/or magnesium salt of any anion $A^-$ satisfying the following requirements:
  a. the potassium salt of anion $A^-$ is only slightly soluble in water or brines while the sodium, calcium and magnesium salts are very soluble,
  b. the anion $A^-$ has a higher affinity than the phosphate ions $H_2PO_4^-$ or $HPO_4^{--}$ for liquid anion exchangers, and the precipitated salt KA is separated from the mother liquor by any known means. The choice of anion will be dictated by economics and convenience; for example, the chlorate ion $ClO_3^-$ is generally the cheapest anion satisfying the above requirements but the solubility of potassium chlorate in water is relatively high, as shown by the following table:

| solubility, gm/kg water, at | 0° | 10° | 20° | 30°C. |
|---|---|---|---|---|
| KClO₃ | 33 | 50 | 74 | 105 |
| KClO₄ | 7.6 | 10.8 | 16.7 | 25 |
| KMnO₄ | 28.4 | 44 | 65 | 91 |
| KReO₄ | 4.8 | 5.8 | 10.1 | 15 |
| K₂PtCl₆ | 7.4 | 9.0 | 11.2 | 14 |
| KBF₄ | 2.5 |  | 6.5 | 9 |

-continued

| solubility, gm/kg water, at | 0° | 10° | 20° | 30°C. |
|---|---|---|---|---|
| KBPh₄ |  |  | 0.05 |  |

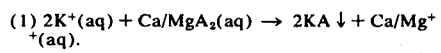

6 Korenman, Analytical Chemisty of Potassium, Israel Program for Scientific Translations, Jerusalem 1965.

so costs of make-up could be appreciable, though in fact the make-up requirements could be produced on site by electrolytic oxidation of chloride-containing brines. The most convenient, and therefore preferred, anion is perchlorate $ClO_4^-$, as the make-up requirements are much less than if chlorate is used, the perchlorates are more stable than the corresponding chlorates, and the make-up requirements of perchlorate ion can also be produced on site by electrolytic oxidation of chloride brines. But any anion, or combination of anions, satisfying the abovementioned two requirements (a) and (b) are to be regarded as falling within the scope of this invention.

The said precipitation of potassium salt KA occurs in accordance with the equation $$(1)\ 2K^+(aq) + Ca/MgA_2(aq) \rightarrow 2KA \downarrow + Ca/Mg^{++}(aq).$$

The quantities of the said calcium or magnesium salt of anion $A^-$ to be added to the potassium-bearing brine may be more, less or equal to the stochiometric requirements equivalent to the potassium content of said brine. If excess of anion $A^-$ is used, the recovery of potassium values from said brine will be improved, but the mother liquor or filtrate after separation of the precipitated salt KA will contain undesirably large quantities of residual anion $A^-$. These can be recovered for re-use by known means such as anion exchange or extraction, but such a recovery step will of necessity involve additional expenditure. As generally the value of anion $A^-$, whichever one of those satisfying the said two requirements (a) and (b) be used, exceeds that of the equivalent amount of potassium ion $K^+$, the preferred mode of operation is to carry out the precipitation of salt KA under conditions of maximum usage of anion $A^+$, i.e. the quantity of calcium and/or magnesium salt of anion $A^+$ used should be less than equivalent to the potassium content of the said brine. In the said preferred mode of operation, the recovery of potassium values will not be complete, but the residual content of anion $A^-$ in the said mother liquor or filtrate will be reduced to a minimum. This residual quantity of anion $A^-$ may be recovered, if desired, by known methods, but it will generally not be economic to do so.

Notwithstanding the above, all proportions of said calcium and/or magnesium salt to the potassium content of said brine are to be regarded as included within the scope of this invention.

As stated in the preceding paragraphs, the preferred mode of operation is such as to minimise the residual content of anion $A^-$ in the mother liquor or filtrate after separation of the precipitated salt KA. A further way of achieving this aim is to carry out the precipitation of salt KA at reduced temperature. The solubilities of potassium salts in water are, generally, very temperature-dependent, so a considerable reduction in residual content of anion $A^-$ in the said mother liquor or filtrate can thus be obtaned. Any temperature from ambient down to the freezing temperature, i.e. temperature of ice formation of the brine, can be used, through the preferred range is from 10° to −10° C, as above 10° C the losses of residual anion A⁻ will be high, whereas below −10° C the additional cost of cooling to such low temperature brings diminishing returns, and in addition the higher viscosity of brines at such low temperatures could increase the difficulty of separating the precipitated salt KA from its mother liquor.

The cooling required to reach the chosen operating temperature can be accomplished by any known means, but should include a heat exchange device to transfer heat between incoming brine which is to be cooled, and cold effluent brine, i.e. filtrate or mother liquor after separation of precipitated salt KA, which can be rewarmed to near ambient temperature. Such devices are known to those skilled in the art. The potassium-bearing brine and the aqueous solution of calcium and/or magnesium salt of anion A⁻ may be cooled prior to mixing, or may be mixed at ambient temperature forming a slurry containing some solid salt KA. In the latter case, it is possible to separate the solid salt KA from its mother liquor, which is subsequently cooled to the chosen temperature of operation thereby precipitating a further crop of solid salt KA, or alternately the said slurry may be cooled to the chosen low temperature to complete the precipitation, all the precipitated salt KA being then removed in one operation. The advantage of prior mixing and partial precipitation of salt KA at ambient temperature is that some of the heat of crystallisation of salt KA is thus dissipated at ambient temperature, instead of at the chosen lower temperature of operation, thereby reducing the refrigeration duty for the process.

All the above modes of operation are feasible and are to be regarded as included within the scope of this invention.

The solid potassium salt KA, as obtained by the means described above, is now to be converted to a potassium phosphate salt, by means of liquid anion exchange using an amine extractant. In one embodiment of the invention, in which mono-potassium phosphate is the desired product, the said anion exchange proceeds according to the equation (2). $KA\ (c,aq) + H_3PO_4\ (aq) + R_3N\ (org) \rightarrow KH_2PO_4(aq) + R_3NH^+A^-(org)$ if carried out in one step, or according to the equations (3). $R_3N(org) + H_3PO_4(aq) \rightarrow R_3NH^+H_2PO_4^-(org) + aq.$ (4). $R_3NH^+H_2PO_4^-(org) + KA(c,aq) \rightarrow KH_2PO_4(aq) + R_3NH^+A^-(org),$ if carried out in two steps, the quantities of salt KA, amine extractant and phosphoric acid being approximately as required by the stochiometry of the above equation (2) or equations (3) and (4).

In another embodiment of this invention, in which a potassium phosphate salt is to be produced containing a $K_2O : P_2O_5$ ratio higher than that of mono-potassium phosphate, the anion exchange proceeds in accordance with the equation (5). $3KA(c,aq) + 2H_3PO_4(aq) + 3R_3N\ (org) \rightarrow KH_2PO_4(aq) + K_2HPO_4(aq) + 3R_3NH^+A^-(org)$ if carried out in one step, or in accordance with the equations (6). $3R_3N(org) + 2H_3PO_4(aq) \rightarrow R_3NH^+H_2PO_4^-(org) + (R_3NH^+)_2\ HPO_4^{--}\ (org) + aq.$ (7). $R_3NH^+H_2PO_4^-(org) + (R_3NH^+)_2\ HPO_4^{--}(org) + 3KA(c,aq) \rightarrow KH_2PO_4(aq) + K_2HPO_4(aq) + 3R_3NH^+A^-(org).$ if carried out in two steps, the proportions of reactants used being as required by the stochiometry of equation (5) or equations (6) and (7). Actually the presence of excess amine, more than that required by equations (5) or (6), may be of advantage to ensure that the desired ratio of di- to mono-phosphate ions in the aqueous phase is in fact obtained.

The amine extractant used in this process, formulated for convenience as $R_3N$ in equations (2) to (7) above, may be one, or more than one used in combination, of a wide variety of types. Secondary or tertiary amines may be used. The amines are generally aliphatic in character, although they may be partially aromatic. The aliphatic hydrocarbon groups can be straight chained or branch chained, saturated or unsaturated, and the two or three hydrocarbon chains need not necessarily be identical. The amine or amines selected should be liquid, stable and of low volatility at ambient temperature, and both it and its salts should be insoluble in an immiscible with water. It is readily seen that a variety of amines fall within the scope of this invention, but the preferred type is a tertiary straight-or branch-chain aliphatic amine, the chain length being from 8 to 12 carbon atoms. Compounds of this type are readily available on the market.

A variety of organic solvents will normally be compatible with the selected amine, specified as above, and its salts, so the choice of diluent is wide. The diluent, or combination of diluents, should be immiscible with water and should be sufficiently different in density from water and from aqueous solutions of potassium phosphates so that no difficulty will arise in phase separation. In addition, the combination of amine and diluent should have a high selectivity for anion A⁻ as compared to phosphate ions, yet at the same time if the anion exchange is carried out in two steps in accordance with equations (3) and (4) or (6) and (7), should have a high extractive power for phosphoric acid from its aqueous solutions. In the latter case, kerosene, for example, would be an unsatisfactory diluent, unless modified by addition of a small amount of long-chain aliphatic alcohol, as the aminekerosene combination is a poor extractant for phosphoric acid. Materials which are preferred are aromatic hydrocarbons such as toluene or any xylene, or chlorinated hydrocarbons such as chloroform or 1, 2 dichloroethane. Oxygenated compounds such as isoamyl alcohol may also be used, but such compounds generally have a considerable solubility in water, which increases solvent losses unless a costly recovery step is incorporated in the process. It is to be understood that all diluents satisfying the requirements of this paragraph, used singly or in combination, fall within the scope of this invention.

The amine concentration in the selected diluent can vary from as low as 1% to an upper limit governed by the solubility of the amine salts with the anion A⁻ or with the phosphate ions $H_2PO_4^-$ and $HPO_4^{--}$ in the said diluent. However, the preferred concentration is not below 10% otherwise very large equipment is required for a given amine throughout.

The phosphoric acid used in the process according to the present invention can come from any convenient source, and its composition can vary over a very side range ranging from say 5% $H_3PO_4$ and upwards. The acid used may be furnace acid, conventional wet-process acid, or acid derived from the acidulation of phosphate rock with hydrochloric or nitric acids. If conventional wet-process acid is used, a small amount of solid phase will form during the anion exchange, this consisting mainly of iron and nickel phosphates; this is very advantageous as it results in the cationic impurities contained in the feed phosphoric acid not appearing in the potassium phosphate product. Likewise, most of the fluoride content of the feed phosphoric acid will appear in this said solid phase. However, the final product will contain potassium sulphate approximately equivalent to the sulphate content of the feed acid, though this is no great disadvantage if the product is to be used as a fertiliser.

The proportion of water to potassium salt KA fed to the anion exchange system can vary over a wide range. Theoretically, it is possible to dissolve the salt KA completely in water, and so conduct the anion exchange as expressed by equations (2), (4), (5) or (7) with only liquid phases present. This could simplify the equipment required for the said anion exchange., e.g. a plate extraction column could be used, but the aqueous extract would be an extremely dilute solution of potassium salts, which would require considerable and costly evaporation or concentration by other means to obtain a solid product. It is therefore preferable to reduce the amount of water fed to the anion exchange system, to less than that required for complete dissolution of salt KA, the lower limit being that amount of water needed to ensure that the potassium phosphates produced by said anion exchange are completely dissolved.

At the beginning of the anion exchange reaction, the salt KA then exists in slurry form, i.e. a partially dissolved state. The mass transfer of ions actually takes place between the two liquid phases, but as the anion exchange proceeds, anions $A^-$ transfer from the aqueous to the organic phase, so that the reactions expressed by the equations

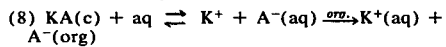
(8) $KA(c) + aq \rightleftarrows K^+ + A^-(aq) \xrightarrow{org} K^+(aq) + A^-(org)$ are shifted to the right, thus more solid KA can dissolve. Ultimately, then, the aqueous phase consists of an aqueous solution of potassium phosphate salts, generally containing some residual $A^-$ ion, which can be reduced to a level as low as desired by increasing the number of counter-current stages in the anion exchange system.

The temperature at which the anion exchange is carried out is not critical. Use of a higher temperature would tend to increase the solubility of salt KA in water, which, as can be seen from equation (8) assists the anion exchange, i.e. more ion transfer would be achieved per contact stage, but the stability of some of the possible anions from which anion $A^-$ is selected is reduced with increasing temperature, likewise the volatility of the selected amine extractant and, particularly, of the diluent, will increase with temperature. Thus the increased losses of reactants and solvents may well offset any gains resulting from improved anion exchange. The preferred temperature is therefore approximately ambient temperature.

The actual conversion of potassium perchlorate, or potassium salt KA is specified above, to potassium phosphate salts can be accomplished according to any of the following sequences:

a. free amine, dissolved in a suitable diluent, is contacted with phosphoric acid in a suitable device to form an organic phase consisting essentially of amine phosphate salts dissolved in the said diluent, and a depleted aqueous layer which can be discarded. The said organic phase is then brought into countercurrent contact, in a separate device, with an aqueous solution or slurry of potassium salt KA, as a result of which an exchange occurs of anion $A^-$ for di- or mono-hydrogen phosphate ions;

b. solid potassium salt KA is mixed with phosphoric acid and, optionally, water, to form an aqueous solution or slurry containing $K^+$ and $H^+$ cations, $A^-$ and phosphate anions, as well as, possible, undissolved solid salt KA. The said solution or slurry is then brought into countercurrent contact, in an extraction device, with a mixture of free amine and diluent, as a result of which there takes place a transfer of $H^+$ cation and $A^-$ anion from the aqueous to the organic phase;

c. Potassium salt KA, in the form of solid, aqueous slurry or aqueous solution, together with phosphoric acid and, optionally, water, is fed to any suitable extraction device and brought into counter-current contact with a mixture of free amine and diluent, as a result of which there takes place a transfer of $H^+$ cation and $A^-$ anion from the aqueous to the organic phase.

The overall result of all those possibilities is the same: an aqueous extract is obtained being essentially a solution of potassium phosphate salt, and an organic phase comprising amine extractant in the form of is salt with anion $A^-$, dissolved in said diluent. The choice of which sequence to adopt is largely a matter of convenience, and all three are to be regarded as falling within the scope of this invention. For example, if the phosphoric acid available is very dilute, say under 10% $H_3PO_4$, sequences (b) and (c) will be undesirable as all the water entering the system in combination with the phosphoric acid feed, will leave the system in combination with the potassium phosphate salt formed therein. The dilute solution of potassium phosphate salt thus obtaned would then require a costly concentration step so as to obtain the desired solid product. In sequence (a), on the other hand, the said contacting of free amine with aqueous phosphoric acid brings about an extraction of the phosphoric acid into the organic phase, so that all the water fed in combination with said phosphoric acid remains behind as a depleted aqueous solution which can be discarded. For the same reason, sequence (a) may be preferred when the available phosphoric acid contains impurities, such as is the case with commercial wet process acid. In such a case, the first step of contacting free amine with acid may effect a preliminary purification, as those cationic impurities present in the wet process acid which do not form phosphate complexes, such as calium and divalent iorn, may remain in the aqueous layer which may be discarded.

It should be noted that sequences (b) and (c) are basically identical except for the fact that in step (b) the solid and aqueous phases are mixed prior to entry to the said extraction device. This may be of advantage in some cases to reduce the contacting time required in the extraction device.

The organic extract from the anion exchange system as described above is now treated with a suitable base so as to re-generate the free amine for reuse. Suitable materials are sodium hydroxide, sodium carbonate, alkaline earth oxides or hydroxides, but for reasons of economy the preferred base is alaked lime and/or magnesia. The contacting may be in one or more stages, and the ratio of base to amine should be not less than stochiometric. The reaction proceeds according to the equation (9) $2R_3NH^+A^-(org) + Ca/Mg(OH)_2 \rightarrow 2R_3N(org) + Ca/MgA_2(aq) + 2H_2O$ The free amine is returned to the anion exchange system, and the aqueous solution of the calcium and/or magnesium salt of anion $A^-$ is recycled for precipitation of potassium salt KA in accordance with equation (1) above.

The aqueous extract from the anion exchange system can be treated by a variety of means to obtain solid products. If the anion exchange proceeds in accordance with equations (2) to (4) above, the aqueous extract will be essentially an aqueous solution of $KH_2PO_4$, from which solid $KH_2PO_4$ can be obtained by known means. These include evaporation, vacuum crystallisation, spray-drying or outsalting with organic water-miscible agents such as lower alcohols or acetone. The aqueous extract may also be treated with potassium compounds such as hydroxide, carbonate, bicarbonate bisulphate, chloride or nitrate, so as to raise the K : P ratio in the solid product over that existing in $KH_2PO_4$. All the above methods may be used singly or in combination.

If the anion exchange proceeds in accordance with equations (5) to (7) above, the aqueous extract will contain mono- and di-potassium phosphates in solution. This solution may likewise be treated by any of the methods in the preceeding paragraph to obtain a solid product being essentially a mixture of $KH_2PO_4$. In addition, it has now been discovered that the ratio of dipotassium phosphate $K_2HPO_4$ to mono-potassium phosphate $KH_2PO_4$ in the aqueous extract from (5) to (7) may be increased by adding an organic agent such as a lower alcohol or acetone in such a proportion such as to effect a partial precipitation only. The precipitate will then be essentially mono-potassium phosphate, which can be sold as such or recycled to steps (5) or (7), and the filtrate will be enriched in dipotassium phosphate. The filtrate, after recovery of the organic agent by known means, is treated by any of the methods given above to obtain a solid product.

The potassium phosphates obtained by any of the above means, whether in solid form or in aqueous solution, may be further processed by known means to obtain polyphosphates.

The following examples which include preferred embodiments will serve to illustrate the practice of this invention, it being understood that the invention is not limited to those specific examples which are intended to merely illustrate but a few preparations performed employing the process of the present invention.

EXAMPLE 1

Preparation of monopotassium phosphate.

Analytical-grade phosphoric acid was diluted to a concentration of 33% $H_3PO_4$ by weight, and contacted with an amine-diluent mixture consisting of 50 ml. Alamine 336 (a commercially available mixed $C_8$-$C_{10}$ tertiary amine) and 150 ml. toluene, the proportion of acid to amine being that required for the formation of mono-amine phosphate. Of the 9.81 gm $PO_4$ fed to the system, 9.56 gm were found to have transferred to the organic phase, representing an extraction effiency of 97.5 %.

The organic phase thus obtained, consisting of mono-amine phosphate dissolved in toluene, was then contacted with an equivalent amount (14 gm) of solid potassium perchlorate, and 150 ml water, so as to accomplish the desired $ClO_4^- - H_2PO_4^-$ exchange. The initial solid phase disappeared completely in the course of the anion exchange, and the following results were obtained:

| | | | |
|---|---|---|---|
| $PO_4$ | in entering organic phase | 9.56 | g. |
| $ClO_4$ | in entering solid phase | 10.04 | g. |
| K | in entering solid phase | 3.96 | g. |
| $PO_4$ | in exit organic phase | 0.1 | g. |
| $ClO_4$ | in exit organic phase | 9.86 | g. |
| $PO_4$ | in exit aqueous phase | 9.46 | g. |
| $ClO_4$ | in exit aqueous phase | 0.18 | g. |
| K | in exit aqueous phase | 3.96 | g. |

The final pH of the aqueous phase was 4.0. Addition of acetone to the aqueous phase gave a crystalline precipitate containing 28.4% K, which compares well with the theoretical potassium content of monopotassium phosphate which is 28.7%.

EXAMPLE 2 preparation of product having a higher K : P ratio.

The procedure of Example 1 was repeated, but the proportion of reagents used was 1 ½ moles of amine to 1 mole of phosphoric acid. The aqueous solution obtained after the anion exchange contained 10.6 gm. $KH_2PO_4$ and 3.7 gm. $K_2HPO_4$ in 150 ml. water, and the pH was 5. Addition of 16 ml methanol to 10 ml. of this solution gave a crystalline precipitate, and a filtrate having a pH of 7.5 which corresponds approximately to a $K_2O : P_2O_5$ weight ratio of 1 : 1.

EXAMPLE 3

Combination of neutralisation and anion exchange, and use of commercial wet-process phosphoric acid.

The following materials were fed to a reaction vessel:
a. 17.4 ml. of a technical grade wet-process phosphoric acid containing 19.62 g. $PO_4$ and 1.2 g. $SO_4$, as well as iron and nickel impurities,
b. 31.1 g. $KClO_4$ containing 22.25 g. $ClO_4^-$,
c. 225 ml. water,
d. 400 ml. organic reagent consisting of 100 ml. Alamine 336 as in Example 1, and 300 ml. toluene.

After mixing for 15 minutes, the following three phases were obtained:
a. 236 ml. of an aqueous solution containing 18.29 g. $PO_4$, 0.845 g. $ClO_4^-$, 1.13 g. $SO_4$, and 8.07 g. $K^+$. The pH of the solution was 4, and the phosphate content represents 93.1 % of that entering in the phosphoric acid used.
b. 394 ml. of an organic phase containing 20.73 g. $ClO_4$, 0.77 g. $PO_4$ and 0.07 g. $SO_4$. The perchlorate content represents 93.1 % of that entering in the potassium perchlorate used.
c. 2 g. of a green solid phase containing 0.67 g. $ClO_4^-$, 0.56 g. $PO_4$, 0.75 g. $K^+$, and traces of nickel and iron.

EXAMPLE 4

Preparation of product having a higher K : P ratio from wet-process phosphoric acid.

The process was carried out as in example 1 with the following alterations:
a. 84 ml of wet-process phosphoric acid, containing 95 g. $PO_4$, were used
b. the mole ratio of amine to acid was 3.5

After anion exchange, 35 g. of a green solid phase were obtained, containing about 30 g. of unreacted $KClO_4$, and also 8.83 % $PO_4$, 0.7 % Fe, 0.3 % Ni, The aqueous phase from the anion exchange was evaporated to dryness, and 120 g. solids (or dry basis) were obtained, these containing 50% $P_2O_5$, 37% $K_2O$ and 3.1% $SO_4$. No residual iron or perchlorate was detected. The $P_2O_5$ content represents 85% of that contained in the phosphoric acid used.

The organic phase from the anion exchange was treated with lime and water to regenerate the free amine, and recover perchlorate in the form of aqueous calcium perchlorate solution. Two stages were used — the first gave 84.1 % perchlorate recovery, and the second gave 40% recovery of the perchlorate remaining in the organic phase, the total recovery being 90.5%. A solid phase was observed after the first stage of regeneration, this consisted of calcium hydroxide, phosphate and sulphate.

EXAMPLE 5

Preparation of $KH_2PO_4$ from $KBF_4$.

Neutralisation of amine and phosphoric acid was carried out as in Example 1. 210 ml. of the resulting organic phase, consisting essentially of solution of mono-amine phosphate in toluene, and containing 9.56 g. $PO_4$, was contacted with 12.6 g. solid potassium fluoborate and 150 ml $H_2O$. After phase separation, 159 ml. of an aqueous phase were obtained containing 3.25 g. potassium and 8.7 g. $PO_4$, the latter representing 91% of the phosphate content of the phosphoric acid used. A solid phase was also obtained, weighing 2 g and consisting essentially of unreacted $KBF_4$.

The regeneration of the organic phase, consisting mainly of amine fluoborate dissolved in toluene, is carried out with a base in accordance with equation (9) above, but care should be taken not to use more than stochiometric quantity of base, as the fluoborate ion is likely to decompose in alkaline surroundings.

It will be evident to those skilled in the art that the invention is not limited to the details of the foregoing illustrative embodiments and examples and that the present invention may be embodied in other specific forms without departing from the spirit or essential attributes thereof, and it is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. A process for the production of potassium phosphates from potassium bearing brines comprising the steps of
    a. selectively precipitating the potassium in the form of an insoluble or slightly soluble salt, wherein the agent used to precipitate the potassium from its brines is an anion $A^-$ characterized by that
        i. the potassium salt KA of said anion is only slightly soluble in water or saline solutions, whereas those of sodium, calcium and magnesium are very soluble, and
        ii. the anion $A^-$ has a higher affinity than the phosphate ions $H_2PO_4^-$ and $HPO_4^{--}$ for liquid anion exchangers; and
    b. thereafter converting said salt to potassium phosphate by reacting said salt with phosphoric acid in at least one step of liquid anion exchange, wherein an organic amine extractant is used in said liquid anion exchange in combination with a liquid inert organic diluent which is immiscible with water and is compatible with said amine in all its possible forms of free amine, di- or mono-hydrogen phosphate salt and salt with the anion $A^-$; whereby there is produced an aqueous phase comprising an aqueous solution of potassium phosphate salts and an organic phase comprising said amine extractant in the form of its salt with anion $A^-$, dissolved in said diluent.

2. A process according to claim 1 wherein the anion $A^-$ is selected from the group consisting of permanganate, perrhenate, perchlorate, chloroplatinate, chlorate, fluoroborate, tetraphenylborate, and mixtures thereof.

3. A process according to claim 1 wherein said precipitating agent is a perchlorate anion.

4. A process according to claim 1 wherein the precipitation is carried out by mixing a potassium-bearing brine and an aqueous solution of a salt of anion $A^-$ with calcium, magnesium or a mixture thereof, the ratio of said salt to potassium content of said brine being not higher than stoichiometric, and the precipitated salt KA being thereafter separated from its mother liquor.

5. A process according to claim 1 wherein the precipitation of potassium salt KA is carried out at a temperature range of between about ambient and about the ice formation temperature of the brine being treated.

6. A process according to claim 5 wherein said temperature is between about −10° C. and about +10° C.

7. A process according to claim 1 wherein the precipitation of potassium salt KA is carried out in two steps, the first step taking place at ambient temperature and the second step at a lower temperature of between −10° C. and +10° C.

8. A process according to claim 1 wherein said amine is selected from the group consisting of long-chain secondary and tertiary amines immiscible with water.

9. A process according to claim 1 wherein said amine is a tertiary straight- and branched-chain aliphatic amine, with chain lengths from 8 to 12 atoms, and mixtures thereof.

10. A process according to claim 1 wherein said diluent is selected from the group consisting of aliphatic hydrocarbons, aromatic hydrocarbons, chlorinated hydrocarbons and mixtures thereof.

11. A process according to claim 1 wherein the concentration of said amine in said diluent is any value from a minimum of about 1% amine to a maximum amount sufficient so that the amine salts with the phosphate anions $H_2PO_4^-$ and $HPO_4^{--}$ and with the anion $A^-$ remain in solution.

12. A process according to claim 25 in which the liquid anion exchange is carried out by a sequence of steps wherein:

a. a mixture of free amine and diluent is contacted with phosphoric acid in a concentration of at least 5% $H_3PO_4$ and upwards, in a suitable liquid-extraction device, in approximately stoichiometric proportions, so as to produce an organic phase consisting essentially of the dihydrogen phosphate salt of the amine dissolved in the said diluent, and an aqueous phase which may be discarded;

b. the organic phase, leaving step (a), is brought into counter-current contact with an aqueous solution or slurry of a potassium salt KA in approximately stoichiometric proportions, such that the aqueous extract is essentially a solution of monopotassium phosphate and the organic phase consists essentially of the amine salt of the anion $A^-$, dissolved in said diluent;

c. the organic phase, leaving step (b), is brought into counter-current or cross-current contact with a base in the form of a solid, aqueous slurry or aqueous solution, the ratio of base to a mine salt being not less than stoichiometric, and the base being any base capable of decomposing an amine salt as obtained in step (b); and d. the products of step (c) are separated into an organic phase consisting essentially of free amine and diluent which is returned to step (a) for re-use thereby completing the amine cycle in the process, and an aqueous phase comprising a solution of calcium or magnesium salt of anion $A^-$ which is reused for further precipiation of salt KA, thereby completing the cycle of said anion $A^-$ in the process.

13. A process for the production of potassium phosphates from potassium bearing brines comprising the steps of
    a. selectively precipitating the potassium in the form of an insoluble or slightly soluble salt, wherein the agent used to precipitate the potassium from its brines is an anion $A^-$ characterized by that
        i. the potassium salt KA of said anion is only slightly soluble in water or saline solutions, whereas those of sodium, calcium and magnesium are very soluble, and
        ii. the anion $A^-$ has a higher affinity than the phosphate ions $H_2PO_4^-$ and $HPO_4^{--}$ for liquid anion exchangers; and
    b. a mixture of free amine and diluent is contacted with phosphoric acid of a concentration of at least 10% and with the potassium salt KA, said potassium salt being in the form of solid, aqueous slurry or aqueous solution, in approximately stoiciometric proportions, such that the aqueous extract is essentially a solution of monopotassium phosphate, and the organic phase consists essentially of the amine salt of anion $A^-$ dissolved in the said diluent; and
    c. the organic phase leaving step (b) is brought into counter-current or cross-current contact in any suitable contacting device comprising one or more stages, with a based in the form of solid, aqueous slurry or aqueous solution, the ratio of base to amine salt being not less than stoichiometric, and the base being any base capable of decomposing an amine salt as obtained in step (b); and
    d. the products of step (c) are separated into an organic phase consisting essentially of free amine and diluent which is returned to step (b) for reuse thereby completing the amine cycle in the process, and an aqueous phase comprising a solution of calcium or magnesium salt of anion $A^-$ which is reused for further precipitation of salt KA in step (d), thereby completing the cycle of said anion $A^-$ in the process.

14. A process as claimed in claim 13 wherein said phosphoric acid and potassium salt KA in form of solid, aqueous slurry or aqueous solution are admixed prior to said contacting with the amine-diluent mixture.

15. A process as claimed in claim 13, wherein the proportions of reagents — amine, phosphoric acid and potassium salt KA — are such that in the aqueous extract from the anion exchange there shall exist a weight ratio of $K_2O$ to $P_2O_5$ ranging from 2:3 to 1:1, the lower limit representing the composition of monopotassium phosphate only and the higher limit representing approximately equimolar proportions of mono- and di-potassium phosphates.

16. A process as claimed in claim 13 in which the aqueous extract solution of monopotassium is treated so as to obtain solid monopotassium phosphate which solid is separated from the mother liquor.

17. A process as claimed in claim 15 wherein the aqueous solution of mono- and di-potassium phosphates is treated so as to obtain a solid product containing the same ratio of $K_2O$ to $P_2O_5$ as exists in said aqueous solution.

18. A process as claimed in claim 15 wherein the aqueous solution of mono- and di-potassium phosphates is partially concentrated by evaporation so as to obtain a precipitate consisting essentially of monopotassium phosphate, and filtrate containing a higher ratio of $K_2O$ to $P_2O_5$ than exists in said aqueous solution, said filtrate being subsequently treated to obtain solid potassium phosphate products.

19. A process as claimed in claim 15 wherein the aqueous solution of mono- and di-potassium phosphates is mixed with at least one of a plurality of water-miscible out-salting agents, so as to obtain a precipitate consisting essentially of monopotassium phosphate and a filtrate containing a higher ratio of $K_2O$ to $P_2O_5$ than exists in said aqueous solution, said filtrate being subsequently treated to recover the out-salting agent or agents and to obtain solid potassium phosphate products.

20. A process as claimed in claim 13 in which the aqueous solution of potassium phosphate salt or salts is treated with at least one potassium-bearing substance in the form of solid, aqueous slurry or aqueous solution, said substances being selected from the group consisting of potassium chloride, sulphate, bisulphate, carbonate, bicarbonate, nitrate and hydroxide, the resulting mixture being processed to yield a solid product containing a higher ratio of $K_2O$ to $P_2O_5$ than exists in said aqueous solution.

21. A process as claimed in claim 19 in which the filtrate obtained therein is treated with at least one potassium-bearing substance in the form of solid, aqueous slurry or aqueous solution, said substances being selected from the group consisting of potassium chloride, sulphate, bisulphate, carbonate, bicarbonate, nitrate and hydroxide, the resulting mixture being processed to yield a solid product containing a higher ratio of $K_2O$ to $P_2O_5$ than exists in said aqueous solution.

* * * * *